US010285408B2

(12) United States Patent
Schimitzek

(10) Patent No.: US 10,285,408 B2
(45) Date of Patent: May 14, 2019

(54) METHOD FOR VISUAL CAPTURE OF DATA RELATING TO ANIMALS THAT ARE TO BE SLAUGHTERED FROM AN ANIMAL THAT IS TO BE SLAUGHTERED

(71) Applicant: CSB-SYSTEM AG, Geilenkirchen (DE)

(72) Inventor: Peter Schimitzek, Geilenkirchen (DE)

(73) Assignee: CSB-System AG, Geilenkirchen (DE)

(*) Notice: Subject to any disclaimer, the term of this patent is extended or adjusted under 35 U.S.C. 154(b) by 20 days.

(21) Appl. No.: 15/321,876

(22) PCT Filed: Jul. 2, 2015

(86) PCT No.: PCT/DE2015/000332
§ 371 (c)(1),
(2) Date: Dec. 23, 2016

(87) PCT Pub. No.: WO2016/000676
PCT Pub. Date: Jan. 7, 2016

(65) Prior Publication Data
US 2017/0142984 A1 May 25, 2017

(30) Foreign Application Priority Data
Jul. 2, 2014 (DE) .................. 10 2014 009 686

(51) Int. Cl.
A22B 5/00 (2006.01)
G06K 9/20 (2006.01)
H04N 7/18 (2006.01)

(52) U.S. Cl.
CPC ............ *A22B 5/007* (2013.01); *G06K 9/2063* (2013.01); *H04N 7/183* (2013.01)

(58) Field of Classification Search
CPC ........... A22B 5/00–5/007; A22B 7/007; A01K 11/00; A01K 11/006; G06K 9/2063; G06K 9/00362; G06K 9/18; H04N 7/18; H04N 7/183; A22C 17/008; A22C 17/10
See application file for complete search history.

(56) References Cited

U.S. PATENT DOCUMENTS

| 4,597,495 | A | 7/1986 | Knosby | |
|---|---|---|---|---|
| 6,231,435 | B1* | 5/2001 | Pilger | A22B 5/0064 452/157 |
| 6,684,810 | B2* | 2/2004 | Martin | A01K 11/008 119/51.02 |
| 6,975,233 | B2* | 12/2005 | Grose | A22B 7/007 340/572.8 |
| 6,997,140 | B2 | 2/2006 | Finlayson | |
| 7,613,330 | B2* | 11/2009 | Mirtsching | A22B 5/007 382/110 |
| 7,999,846 | B2* | 8/2011 | Kiyohara | G06K 9/00255 348/143 |
| 8,126,264 | B2 | 2/2012 | Kaftory et al. | |
| 8,400,521 | B2* | 3/2013 | Okamoto | H04N 5/23212 348/222.1 |
| 8,855,423 | B2* | 10/2014 | Boncyk | G06F 17/30259 382/181 |
| 8,878,651 | B2* | 11/2014 | Kwak | A22B 5/0064 340/10.1 |
| 9,000,893 | B2* | 4/2015 | Kwak | G06K 19/0723 209/3.2 |
| 2001/0031072 | A1* | 10/2001 | Dobashi | G06K 9/00228 382/118 |
| 2002/0116390 | A1* | 8/2002 | Meadows | A01K 11/00 |
| 2003/0051678 | A1* | 3/2003 | Martin | A01K 11/008 119/712 |
| 2003/0075053 | A1 | 4/2003 | Khodabandehloo et al. | |
| 2003/0164878 | A1* | 9/2003 | Iizaka | G06Q 30/02 348/169 |
| 2004/0095242 | A1* | 5/2004 | Grose | A22B 7/007 340/572.1 |
| 2004/0144333 | A1* | 7/2004 | Finlayson | A01K 11/00 119/858 |
| 2006/0133648 | A1* | 6/2006 | Meunier | H04B 10/1149 382/103 |
| 2007/0189585 | A1* | 8/2007 | Sukegawa | G06K 9/00221 382/118 |
| 2008/0260244 | A1* | 10/2008 | Kaftory | H04N 1/6033 382/165 |
| 2010/0027894 | A1* | 2/2010 | Dahari | G06T 7/0008 382/218 |
| 2010/0128063 | A1* | 5/2010 | Huo | G06F 19/321 345/620 |
| 2010/0157062 | A1* | 6/2010 | Baba | G07C 9/00111 348/156 |
| 2010/0232656 | A1* | 9/2010 | Ryu | G06F 17/218 382/118 |
| 2010/0246970 | A1* | 9/2010 | Springer | A01K 11/006 382/195 |
| 2010/0260426 | A1* | 10/2010 | Huang | G06F 17/30247 382/218 |
| 2011/0096148 | A1* | 4/2011 | Stratmann | G01J 5/02 348/46 |

(Continued)

FOREIGN PATENT DOCUMENTS

DE 19502689 A1 8/1996
EP 1212939 A1 6/2002
(Continued)

*Primary Examiner* — Michael S Osinski
(74) *Attorney, Agent, or Firm* — Laurence A. Greenberg; Werner H. Stemer; Ralph E. Locher

(57) ABSTRACT

A method to capture data for animals to be slaughtered with an image capture unit that has an image capture range in which a surface of an animal to be slaughtered is captured visually and in which image points on the surface of the animal are captured. The capture unit provides image point data from the image points in transmittable form. An evaluation unit captures the point data and uses the point data to capture markings on the rear surface of the animal. The evaluation unit provides the markings as a storable capture result. Image points on the surface of the animal are captured in the image capture range. The points contain the markings. The capture unit transmits the point data. The evaluation unit captures the image point data. The method makes an association of an identification code for an animal with the point data. The evaluation unit provides the markings as a storable capture result with the code for the animal.

3 Claims, No Drawings

(56) References Cited

U.S. PATENT DOCUMENTS

| | | | | |
|---|---|---|---|---|
| 2013/0058530 A1* | 3/2013 | Naito | ............... | G06K 9/00208 382/103 |
| 2013/0058541 A1* | 3/2013 | Susaki | ............... | G06K 9/00 382/110 |
| 2014/0097940 A1* | 4/2014 | Kwak | ............... | A22B 5/0064 340/10.1 |
| 2014/0334673 A1* | 11/2014 | Naito | ............... | G06K 9/00624 382/103 |
| 2014/0355838 A1* | 12/2014 | Miyakoshi | ............... | G06K 9/46 382/106 |
| 2015/0110345 A1* | 4/2015 | Weichselbaum | ...... | G01S 3/7864 382/103 |
| 2015/0289478 A1* | 10/2015 | McGlone | ............... | A01K 11/006 382/110 |
| 2015/0379347 A1* | 12/2015 | Mishra | ............... | G06K 9/00577 348/143 |
| 2016/0042245 A1* | 2/2016 | Ishiyama | ............... | G06K 9/00577 382/190 |
| 2016/0055391 A1* | 2/2016 | Kim | ............... | G06F 17/30256 382/203 |
| 2016/0125252 A1* | 5/2016 | Harada | ............... | G06K 9/50 382/103 |
| 2016/0155011 A1* | 6/2016 | Sulc | ............... | G06T 7/73 382/103 |

FOREIGN PATENT DOCUMENTS

| | | | |
|---|---|---|---|
| WO | 9933021 | A1 | 7/1999 |
| WO | 0180654 | A1 | 11/2001 |
| WO | 03003820 | A1 | 1/2003 |
| WO | 2005100033 | A1 | 10/2005 |
| WO | 2011021193 | A1 | 2/2011 |

\* cited by examiner

METHOD FOR VISUAL CAPTURE OF DATA RELATING TO ANIMALS THAT ARE TO BE SLAUGHTERED FROM AN ANIMAL THAT IS TO BE SLAUGHTERED

BACKGROUND OF THE INVENTION

Field of the Invention

The invention relates to a method for capturing data relating to abattoir animals, in particular for capturing any existing markings, on an abattoir animal.

When breeding and processing animals for slaughter, in particular pigs for slaughter, the animals for slaughter are frequently provided with markings which may be present as alphanumeric, numeric or letter sequences or other characters, and can be, for example, stamped or printed on.

The marking can provide information relating to the breeding establishment, the age or the sex of the abattoir animal.

In particular when breeding and processing pigs for slaughter, provision is generally made for the boar to be marked before being sold to the abattoir. This serves for the calculation of the sales proceeds of the respective pig for slaughter, since boars typically give a worse carcass yield which is to be taken into consideration. In addition, the marking serves for identifying the sex of the pig for slaughter so as to permit a statement to be made with respect the strength of the smell of the pig for slaughter that should be expected due to boar taint and to the corresponding processing of the pig for slaughter.

It is furthermore conceivable that the markings are not applied until during the slaughtering process, wherein such a marking can, for example, be a unique identification mark in the form of a registration number.

It can be necessary or expedient to capture the markings on the respective abattoir animal during the processing process of the abattoir animal.

According to the prior art, any markings are typically captured visually by corresponding staff as part of incoming control in the abattoir.

The captured marking data can then be registered by hand and transferred to data processing.

However, the manual capturing of existing markings on an abattoir animal in particular has the disadvantages that corresponding staff must be provided and that this causes significant time expenditure on capturing and transferring the marking data, and that additionally markings are not properly recognized or are captured incorrectly.

In addition, errors may be caused in particular when staff transfer the marking data to the data processing and storage.

With respect to the disadvantages of the prior art, the object of the present invention is the provision of a method for capturing data relating to abattoir animals on an abattoir animal, which method permits automated and at the same time quick and efficient capturing of the data and which may additionally be performed cost-effectively.

BRIEF SUMMARY OF THE INVENTION

The object is achieved by way of a method having the features listed in patent in the independent claim(s). Preferred developments can be gathered from the dependent claims.

A method according to the invention for capturing data related to abattoir animals on an abattoir animal is performed here using an image capturing unit and an evaluation unit.

Capturing here preferably takes place at the beginning of the processing process of the abattoir animal, wherein the abattoir animal moves past the image capturing unit, generally guided on a tubular track. Here, the abattoir animal has preferably already been split and is thus present in the form of abattoir animal halves.

The image capturing unit here has an image capturing region through which the abattoir animal passes. Passing through the image capturing region is done in a manner in which a rear-side surface of the abattoir animal faces the image capturing unit, with the result that image points on the rear-side surface of the abattoir animal are capturable.

The rear-side surface of an abattoir animal within the meaning of this invention relating to an abattoir animal half is the outer side that is located opposite a split side. In an abattoir animal that has not yet been split into abattoir animal halves, the rear-side surface is also the surface having animal skin.

The image capturing unit is furthermore able, according to the invention, to provide image point data of the image points, in particular in the present case as surface or spatial coordinates and light intensity or color values of the image points, such that they can be transferred.

The evaluation unit is connected to the image capturing unit in wired fashion or wirelessly and is able to capture the image point data and to ascertain, on the basis of the image point data, markings on the rear-side surface of the abattoir animal.

The ascertainable markings are here, for example, in the form of a pattern, graphic characters, color characters, letter characters, number codes, barcodes or QR codes, which were printed, burnt, labeled, written or were applied using a stamp onto the abattoir animal, for example, before or during the slaughtering process.

Capturing of the markings by way of the evaluation unit is effected on the basis of differentiating between the light or color values of the image point data of the markings and the light or color values of the image point data of the remaining skin of the rear-side surface.

The evaluation unit is further able to provide the captured markings as a storable capturing result, wherein storing of the capturing result can be effected both in the evaluation unit itself and in an external data processing or data storage unit.

The method according to the invention has the following method steps:

a) capturing the image points on the rear-side surface of the abattoir animal in the image capturing region by way of the image capturing unit, wherein the image points contain the markings, b) transferably providing the image point data of the image points by way of the image capturing unit, c) capturing the image point data by way of the evaluation unit, d) assigning an abattoir animal identification code to the image point data, e) providing the markings as a storable capturing result having an assigned abattoir animal identification code by way of the evaluation unit.

In the first method step a), capturing the image points on the rear-side surface of the abattoir animal is effected by the image capturing unit. To this end, the abattoir animal is, as described above, guided along the tubular track past the image capturing unit such that the rear-side surface thereof in the image capturing region is captured. Here, either the entire rear-side surface of the abattoir animal or only specific, previously specified portions of the rear-side surface in the image capturing region can be captured.

In either case, the image points are captured such that they contain the markings which are present on the rear-side surface of the abattoir animal.

In the second method step b), transferably providing the image point data of the image points is effected by way of the image capturing unit. The provided image point data here contain in particular the surface and/or spatial coordinates of the image points and their light intensity and/or color values.

The image point data are here transferably provided either individually or grouped together in an image point data set.

In method step c), capturing the provided image point data is subsequently effected by way of the evaluation unit, wherein the transmission of the image points from the capturing unit to the evaluation unit can be effected wirelessly or in wired fashion via the corresponding connection.

Method step d) according to the invention makes provision for the image point data to be assigned an abattoir animal identification code.

The abattoir animal identification code here represents an identification code which is assigned to the abattoir animal at the beginning of the abattoir animal processing process and which permits the abattoir animal to be uniquely identified at any time. The identification code can here for example be a serial animal number.

Method step d) in the present case does not necessarily have to be performed after method step c). Instead, it is also possible to perform method step d) for example after method step b). Performing method step d) can be effected in particular by way of the evaluation unit.

In method step e), providing the markings as a storable capturing result with an assigned abattoir animal identification code is effected by way of the evaluation unit.

Providing the markings as a storable capturing result is understood to mean that the markings are providable such that they may be stored either in the evaluation unit itself or in an external data storage unit.

Storing the markings serves in particular for archiving the data related to abattoir animals and permits later traceability of the abattoir animal.

All method steps according to the invention are with particular advantage performable in real time, as a result of which in particular in-line integration of the method in a running abattoir animal processing process is made possible, without the capturing of the data related to abattoir animals causing a significant delay of the abattoir animal processing process.

In addition, the method allows, as a particular advantage, to dispense with manual capturing performed by corresponding staff, as a result of which in particular the time expenditure and costs for capturing the data related to abattoir animals and at the same time the error rate during capturing can be reduced.

A further advantage of the method according to the invention is that it is performable using capturing apparatuses which already exist in the abattoir animal processing process, for example those for capturing the split-side surface of the abattoir animal or for volumetric measurement of an abattoir animal. To this end, the abattoir animal halves are advantageously successively guided on the tubular track, wherein in each case one abattoir animal half is aligned such that the split side faces the image capturing region of the image capturing units, and the respectively other, associated abattoir animal half is aligned such that the rear side faces the image capturing region of the image capturing unit. It is possible in this way to dispense with a separate image capturing unit and a corresponding, separate evaluation unit, as a result of which in particular the overall costs for the abattoir animal processing process can be kept low.

The captured markings can then for example be used directly for evaluation by the above-described optical capturing apparatuses.

In an advantageous development of the method, providing the markings as a storable capturing result is effected in method step e) in the form of an image, in particular in the present case in an electronic form as an image file.

The development mentioned here in particular has the advantage that archiving which is secure in terms of evidence is possible. Furthermore, such markings which cannot be uniquely identified can also initially be secured by way of archiving, as a result of which later evaluation remains a possibility. In addition, the archiving of the data related to abattoir animals can be provided with the lowest possible costs, since in the present case only the image together with the abattoir animal identification code needs to be stored for archiving.

In a further advantageous development of the method, object identification on the basis of the captured image point data is performed in method step e) by the evaluation unit, wherein this development can be present both in addition to and as an alternative to a mere archiving in the form of an image file.

In the object identification, the image points of the present markings are extracted from the image point data, and the type of the marking is ascertained, for example, on the basis of a classifier. Providing the markings as a storable capturing result is effected in this case as an object identification result from which the concrete type of the marking becomes clear.

In this way, by way of the evaluation unit, the data related to abattoir animals, for example the breeding establishment of the abattoir animal or its sex, can be ascertained and automatically provided for the archiving or controlling of corresponding processing processes, which follow the capturing of the data related to abattoir animals, within the abattoir animal processing process. It is thus possible, on the basis of an object identification result, to generate a control signal using electronic data processing, which signal influences the function for example of a processing unit or a transport unit, by way of which for example an abattoir animal is removed from the regular processing process and supplied to special processing or examination. The control signal can be related to various steps of the abattoir animal processing process, such as for example also labeling.

It is furthermore possible to particularly efficiently use the advantages of the method according to this development by stamping or in a similar way applying markings as carriers of relevant information, for example with respect to the establishment of provenance, the sex or the processing before or in particular also during the slaughtering process. It is possible in this way, in particular in connection with the described object identification and automatic generation of a control signal, to control the slaughtering processing process without any data having to be input into the production control or the electronic data processing system, which would frequently be disadvantageous for time reasons, reasons of hygiene or for reasons of operational security. As a particular advantage, it is possible for example for a member of staff who does not have access to a data input device to apply a stamp print of a defined stamp if he determines an irregular state or determines a specific property of an abattoir animal and to thus transfer information related to abattoir animals to the electronic data processing system or to trigger a specific processing or examination. At the same time, the stamp can contain information regarding the identity of the member of staff, in particular in coded fashion. In the simplest case, control of the processing process can also be effected by placing a color marking of a previously defined color.

According to an advantageous development of the method, the method step e) is followed by a method step f). In method step f), the capturing result is archived, with the abattoir animal identification code being assigned. Preferably, the archiving is performed in a central database of the abattoir in a data set related to abattoir animals. The archived capturing result can here be present in the form of an image file, of an object identification result or cumulatively in both forms.

DESCRIPTION OF THE INVENTION

The invention will be explained below as an exemplary embodiment on the basis of capturing data related to abattoir animals on an abattoir pig.

The abattoir pig is, in the present case, a boar which was provided with an identification corresponding to its sex and its provenance by way of a marking stamp as part of the abattoir pig processing. The identification takes the form of a marking on the rear-side surface of the abattoir animal.

The method according to the invention is performed in the exemplary embodiment mentioned here at the beginning of an abattoir animal processing process as part of incoming control of the abattoir animal.

Performing the method according to the invention is effected using an image capturing unit having an image capturing region and using an evaluation unit which is connected wirelessly to the image capturing unit.

In a first method step a), capturing of image points on the rear-side surface of the abattoir animal in the image capturing region is effected by the image capturing unit. Here, the abattoir animal is guided past the image capturing unit, guided on a tubular track, such that the portion of the rear-side surface which contains the marking passes through the image capturing region, and thus the marking is contained in the captured image points.

In a subsequent method step b), image point data of the captured image points are provided transferably by the image capturing unit. The image point data in the present case contain the surface coordinates and a light intensity value of the respective image point.

The provided image point data are subsequently captured by the evaluation unit in a method step c), wherein the evaluation unit assigns in a further method step d) a previously determined abattoir animal identification code to the image point data. The abattoir animal and the assigned marking can be identified at any time without problems and traced back on the basis of the abattoir animal identification code.

The abattoir animal identification code in the present case is established at the beginning of the abattoir animal processing process and stored in the evaluation unit.

The markings contained in the image point data of the abattoir animal are provided in a final method step e) as a storable capturing result and archived for example in a database.

According to an advantageous embodiment of the method, the evaluation unit carries out an object identification on the basis of the image point data in method step e).

As part of the object identification, the image points which apply to the marking are ascertained on the basis of their light intensity value, and the associated surface coordinates are inscribed into the surface coordinate system which is programmed into the evaluation unit.

The evaluation unit subsequently ascertains, using an object identification algorithm, the form of the marking on the basis of the image points which are inscribed into the surface coordinates system and assigns them, for example using a classifier, to a corresponding type of marking, for example a stored breeding establishment or sex identification. The evaluation unit is thus able in this case to automatically ascertain, on the basis of the captured marking, the data related to abattoir animals on the abattoir animal, such as for example its sex and/or location of origin, and to provide the corresponding marking with the associated abattoir animal identification code for storage.

All the method steps are here carried out in real time, with the result that as a particular advantage, the method can be integrated without problems into existing abattoir animal processing process, without its temporal sequence being significantly disturbed by the capturing method.

The invention claimed is:

1. A method for capturing data related to a slaughtered abattoir animal and affecting a specific processing of the animal, the method comprising:
   providing an image capturing unit having an image capturing region for optically capturing a rear-side surface of the abattoir animal;
   marking the abattoir animal with markings on the rear side surface;
   a) guiding the animal on a tubular track past the image capturing unit and capturing image points on the rear-side surface of the abattoir animal in the image capturing region with the image capturing unit, the image points containing the markings on the rear-side surface of the abattoir animal;
   b) transferring image point data of the image points with the image capturing unit,
   c) capturing the image point data with an evaluation unit connected to the image capturing unit and capturing the markings using the image point data;
   d) assigning an abattoir animal identification code to the image point data with the evaluation unit; and
   e) providing the markings as a storable capturing result having the assigned abattoir animal identification code by way of the evaluation unit and performing an object identification with the evaluation unit on the basis of the image point data and providing the markings as a storable object identification result;
   after method step e), performing a further step f1) of automatically generating a control signal from the storable object identification result with the evaluation unit and using the control signal for triggering and controlling a specific abattoir animal processing process.

2. The method according to claim 1, wherein the markings are provided as a storable image in method step e).

3. The method according to claim 1, further comprising after step e), performing a further step f) of storing the storable capturing result with the abattoir animal identification code being assigned.

* * * * *